United States Patent

[11] 3,582,091

| [72] | Inventor | Thomas R. Smith |
| | | Newton, Iowa |
| [21] | Appl. No. | 886,139 |
| [22] | Filed | Dec. 18, 1969 |
| [45] | Patented | June 1, 1971 |
| [73] | Assignee | The Maytag Company |
| | | Newton, Iowa |

[54] SEAL CONSTRUCTION FOR FLUID EXTRACTOR
10 Claims, 4 Drawing Figs.

[52] U.S. Cl....................................................... 277/83,
68/26, 210/365, 277/30
[51] Int. Cl....................................................... B07b 1/42,
D06f 29/00, F16j 15/32
[50] Field of Search............................................ 277/30, 83;
86/126; 210/364, 365

[56] References Cited
UNITED STATES PATENTS

| 2,586,739 | 2/1952 | Summers...................... | 277/83 |
| 2,969,172 | 1/1961 | Hutt............................. | 210/365X |
| 3,132,098 | 5/1964 | Bochan ........................ | 210/365 |

Primary Examiner—Robert I. Smith
Attorneys—William G. Landwier and Richard L. Ward ABSTRACT: A seal construction for a fluid extractor includes an unattached noninterlocking seal nose providing a static and dynamic seal with a rotatable member and providing a static seal with a nonrotatable member. The nonrotatable member in this disclosure is in the form of a resilient member having annular undulations permitting nutational movement of the spinner relative to the fluid container. The seal nose is biased into engagement with the rotating spinner and nonrotating resilient member to maintain the dynamic and static seals.

PATENTED JUN 1 1971

INVENTOR
THOMAS R. SMITH
BY
William G. Landwier
AGENT

SEAL CONSTRUCTION FOR FLUID EXTRACTOR

BACKGROUND OF THE INVENTION

1. Field of the Invention

This invention relates to fluid extractor seal constructions and more particularly to a seal member assembled in a loose, unattached condition and operable under biasing for providing static and dynamic seals between a rotating and a nonrotating member.

2. Description of the Prior Art

Prior art discloses seal members that are an integral part of the seal assembly by virtue of captive molding or by adhesive bonding. Prior art also discloses seal members free for axial movement relative to a shaft but retained and prevented from rotational movement by positive interlocking devices. Each of the prior art methods present fabrication problems resulting from improper bonding or from increased cost and difficulties associated with achieving proper interlocking relationships.

SUMMARY OF THE INVENTION

It is therefore an object of the instant invention to provide an improved seal construction including an unattached and noninterlocking seal member operative for effecting dynamic and static seals between rotating and nonrotating members in a fluid extractor apparatus.

It is a further object of the instant invention to provide an improved seal construction including an unattached and noninterlocking seal member having engagement with an axially biased nonrotatable member for effecting a static seal and engageable with a nutationally mounted fabric container for effecting a static and dynamic seal.

These objects are achieved in a centrifugal fluid extractor apparatus of a laundry machine wherein a seal assembly is disposed in the opening of a fluid container encircling the shaft of the driven spinner and including an unattached and noninterlocking seal member disposed between a nonrotatable seal member and the rotatable spinner and biased to a position effecting a static seal on one side and a static and dynamic seal on the other side.

Operation of the device and further objects and advantages thereof will become evident as the description proceeds and from an examination of the accompanying two pages of drawings.

DESCRIPTION OF THE DRAWINGS

The drawings illustrate a preferred embodiment of the invention with similar numerals referring to similar parts throughout the several views wherein:

FIG. 3, shown on the sheet with FIG. 1, is a fragmentary section view showing the upper portion of the spinner mounting system of the extractor portion of the laundry machine of FIG. 1; and FIG. 4, shown on the sheet with and below FIG. 1, is a fragmentary section view showing further details of the lower portion of the spinner mounting system of the instant invention.

DESCRIPTION OF THE PREFERRED EMBODIMENT

Figure 1:
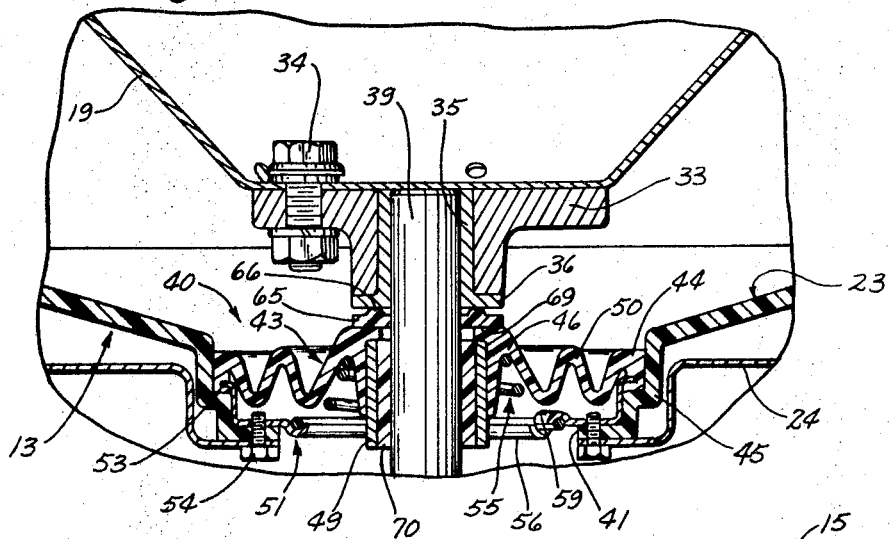
FIG. 1 shows a simplified perspective view of a laundry machine including a centrifugal extractor apparatus.

Referring to FIG. 1, there is shown a laundry machine 10 including washing and centrifugal extraction portions 11 and 12 enclosed within a tub 13 and in turn in a cabinet structure 14 wherein the washing and centrifugal extraction portions 11 and 12 are individually accessible through a pair of panels or lids 15 and 16. The instant invention is primarily directed to the centrifugal extraction portion 12 of the laundry machine 10 and to the mounting of the perforated fabric container 19 within the tub 13.

Figure 2:
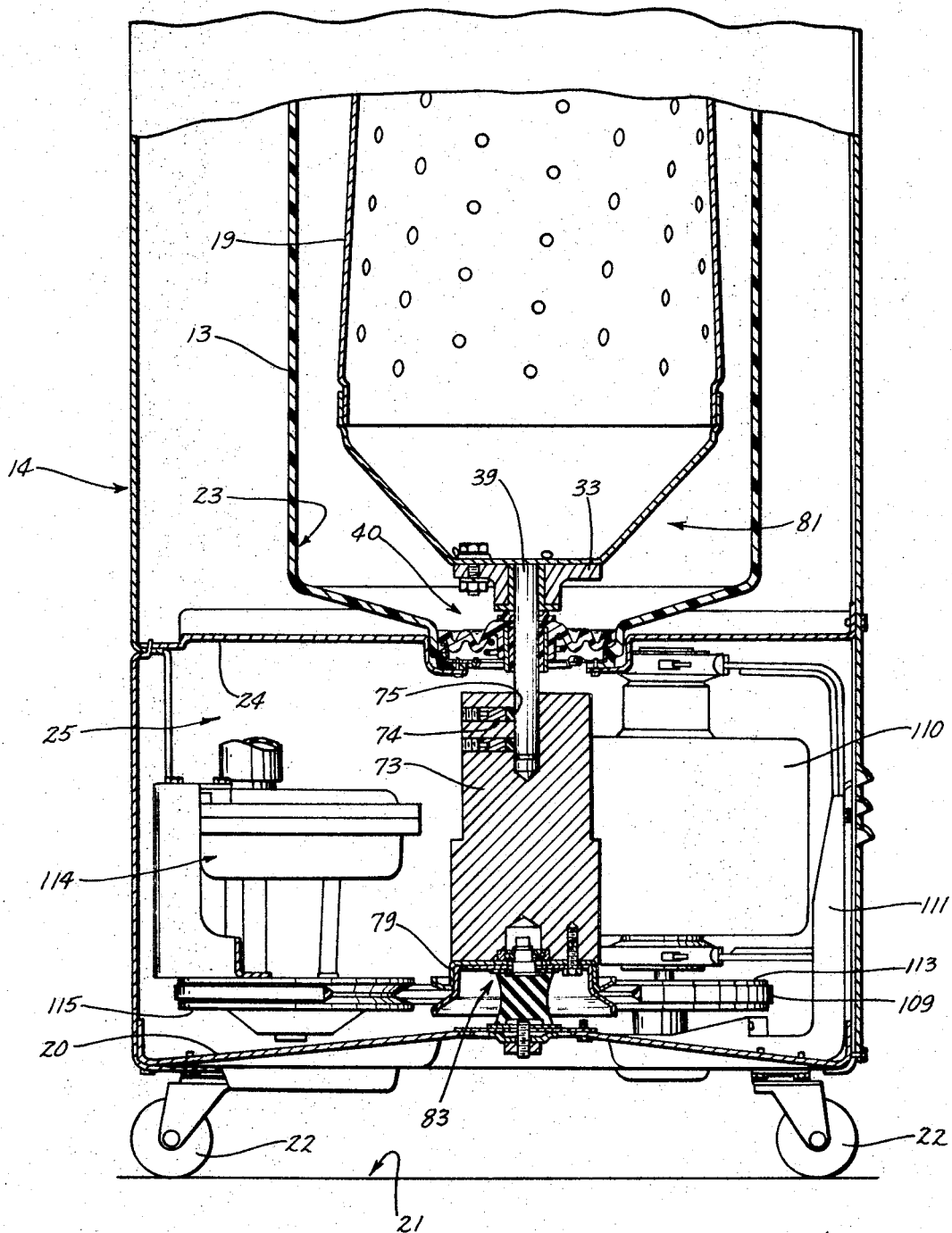
FIG. 2, shown on the second sheet of drawings, is a vertical section view of the centrifugal extractor portion of the laundry machine of FIG. 1.

The section view of FIG. 2 shows generally the overall construction of the centrifugal extraction portion and the mounting system and drive system of the rotatable fabric container 19. The cabinet structure 14 is mounted on a base member 20 that is in turn supported on a horizontal surface 21 by a plurality of casters 22. The tub 13 within the cabinet structure 14 defines a compartment or fluid container 23 in which is disposed the rotatable fabric container 19. A substantially horizontal divider or bulkhead 24 is positioned below the tub 13 and defines a lower chamber 25 for the drive system and supporting system for the container 19. The bulkhead 24 serves primarily as a barrier between the plastic tub 13 and the lower chamber 25 and is not considered a support member for the tub 13.

The system for supporting the container 19 is shown more specifically in FIGS. 3 and 4. Referring to FIG. 3, the fabric container 19 is fixed to a hub 33 by a plurality of threaded fasteners such as the nut and bolt assembly 34. The hub 33 includes a stainless steel insert 35 having a lower annular flange portion 36. A shaft 39 is fixed to the hub 33 by a press fit into the insert 35.

A seal assembly 40 is positioned adjacent the bottom opening 41 of the fluid container 23 and is operable for sealing the bottom wall of the container 23. The seal assembly 40 includes a molded resilient member 43 including an annular outer portion 44 engageable with the tub wall 45 around the opening 41, an inner portion 46 in which is molded a rigid sleeve 49, and a convoluted portion 50 extending between the inner and outer annular portions 46 and 44. This construction permits substantially lateral movement of the shaft 39 relative to the opening 41 resulting from nutational movement of the fabric container 19 relative to the fluid container 23 during centrifuging operation of the fabric container 19. A retainer 51 includes an outer annular flange 53 extending into a groove of the outer annular portion 44 of the molded member 43. The retainer 51 is securely attached to the tub member 13 with a plurality of screws 54 for retaining the molded resilient member 43 in a sealing engagement with the wall portion 45 surrounding the opening 41 in the bottom wall of the tub 13.

A truncated cone-shaped spring member 55 operates between the retainer 51 and the inner portion 46 of the resilient molded member 43. The lowermost coil of the spring is captured by the inner flange 56 of the retainer 51 and by a plurality of tabs 59 formed upwardly at the inner periphery of the retainer 51.

A seal member 65 is disposed between the upper face of the inner portion 46 of the molded member 43 and the lower face of the hub insert flange 36. The seal member 65 includes a relatively small upper surface 66 and a relatively large lower surface 69 and may be molded of a plastic material. The seal member 65 is assembled in a loose condition independent of the adjacent parts and initially free for rotational and axial movement relative to the shaft 39. The spring member 55, however, effects and maintains engagement of the lower surface 69 of the seal member 65 with the upper face of the resilient member 43 to provide a static seal and engagement of the relatively smaller upper surface 66 of the seal member 65 with the insert flange 36 to provide a static seal when the spinner 19 is at rest and a dynamic seal when the spinner 19 is centrifugally rotated. The seal member has a noninterlocking relationship with the shaft 39, insert flange 36, and seal assembly 40 and only the biased frictional engagement of the lower surface 69 with the resilient member 43 prevents rotation of the seal member 65. Selection of the proper spring configuration and characteristics require consideration of the loading of fluid within the fluid container 23 on the seal assembly 40 and the side-to-side movement of the seal assembly 40 under unbalanced loading of the spinner 19. The container 23 is capable of retaining water to a height of approximately 16 inches and therefore the downward loading on the seal assembly is considerable. The spring 55 must be sufficiently strong to overcome this force and maintain proper seating of the seal member 65. The spring 55 must also permit the sideto-side or lateral movement while insuring sufficient loading on the seal member 65 to maintain a proper static or dynamic seal at all times.

In a specific embodiment the spring has the following characteristics:

material: 0.105 inch diameter hard drawn steel wire
diameter at top: 1⅜ inches
diameter at bottom: 2¼ inches
free length: 1¼ inches
installed length: twenty three thirty-seconds inch approximately
installed biasing force: 7½ pounds In this embodiment the seal member 65 is molded of TFE filled acetal plastic with an outside diameter of 1.25 inches and having an upper seal face of approximately 0.25 square inches and a lower seal face of approximately 0.91 square inches.

The seal assembly 40 supports a bearing 70 having a press fit within the sleeve 49 and engageable with the shaft 39. The nutational movement of the shaft 39 is transmitted to the bearing 70 so that as the rotating spinner 19 moves from a vertical axis under unbalanced loading the seal assembly 40 and seal member 65 will move together and maintain, with proper spring biasing, engagement between the seal member 65 and the hub insert flange 36.

Referring to FIG. 2, the mounting of the centrifugally rotatable fabric container 19 further includes a weighted coupling member 73 fixed to the shaft 39 through a pair of setscrews 74 and shaft-engaging urethane plugs 75. Referring now to FIG. 4, a drive pulley 79 is attached to the lower end of the weighted coupling member 73 by a plurality of threaded members such as 80. Generally, it may be stated that the container 19, hub 33, shaft 39, coupling 73, and driven pulley 79 comprise a spinner assembly or spinner 81.

The spinner assembly 81 is rotatably and nutationally supported on the base member 20 by mounting means 83 having a lower end portion 86 mounted on the base 20 and an upper end portion 84 connected with the spinner assembly 81 through a ball bearing 85. The upper end portion 84 includes a rigid plate 89 and a stub shaft 90 fixed thereto and extending upwardly therefrom for receiving the inner race of the ball bearing 85. The bearing 85 has a press fit on shaft 90 and is additionally retained thereon by a retaining ring 91. The lower portion 86 of the mounting means 83 includes a plate 93 and downwardly extending bolt 94. The upper portion 84 and lower portion 86 are joined by a resilient portion 95 bonded to each of the end portions for permitting nutational movement of the spinner assembly 81 relative to the base 20.

Also shown in FIG. 4 is a fragmentary portion of the base member 20 and a removable panel 99 fixed to the base member 20 by a plurality of screws 100, such as the one shown. The panel 99 is limited to a predetermined assembly position on the base 20 by the upwardly turned tab 101 indexing with a recess 103 in the panel 99. This panel 99 may be attached to the base 20 therefore in only one predetermined orientation. The panel 99 has an aperture 104 significantly larger than the bolt 94 to permit movement of the lower mounting means portion 86 relative to the panel 99. The mounting means 83 is connectable to the removable panel 99 by a clamping arrangement including the plate 93 and domed washer 105 engageable with the removable panel 99, and a nut 107 engageable with the bolt member 94 for securely clamping the plate 93 and washer 105 to the intermediate panel 99.

This mounting arrangement permits the movement of the mounting means 83 in a horizontal plane relative to the base member 20 so that the spinner assembly 81 tends to pivot about the general area of the seal assembly 40 during the centering procedure. The movement of the mounting means 83 and the pivoting at the seal assembly 40 permits the selective centering of the spinner assembly 81 on a substantially vertical axis. The nut 107 may then be tightened onto the bolt 94 to securely clamp the mounting means 83 in the selected position. In this construction the spinner assembly 81 is removable from the base 20 without disturbing the centering adjustment between the mounting means 83 and the removable panel 99. When disassembly of the spinner assembly 81 from the base 20 is necessitated, by the need to replace the drive belt 109 for example, the intermediate panel 99 may be removed from the base 20 and then be replaced in its predetermined orientation and the spinner assembly 81 assumes its previously centered position.

The drive system for the centrifugal extractor is shown generally in FIG. 2 and includes an electrically energizable motor 110 rigidly mounted to the base 20 through the mounting bracketry 111. A drive pulley 113 is disposed at the lower end of the motor 110 in substantially the same horizontal plane as the spinner assembly pulley 79 and is drivingly connected thereto by the belt 109.

The laundry machine further comprises fluid pumping means 114 operable for controlling fluid flow in the fluid system of the laundry machine and including a pulley 115 substantially aligned in the horizontal plane of the driving pulley 113 and the driven pulley 79. The pump pulley 115 is driven by the motor 110 for operating the pump but in addition the pumping means 114 is pivotally mounted on the base 20 so that the pump pulley 115 is operable as an idler in the drive system of the extractor to maintain proper driving tension on the endless driving belt 109.

Further details of construction and mounting of the drive system and pumping system of the centrifugal extractor and also a control system for the centrifugal extractor are shown in the copending application entitled "Spinner Control for a Laundry Apparatus" filed by Thomas R. Smith on the date of filing of the instant invention and having a common assignee.

The foregoing description therefore clearly shows that the instant invention provides an improved seal construction for a centrifugal apparatus. More specifically, the seal construction includes an independent, unattached, and noninterlocking seal member assembled loosely to the centrifugal apparatus and having surfaces engageable with rotatable and nonrotatable members to provide a static and dynamic seal at all times under a biasing force. This invention obviates production problems associated with bonding the seal member to a seal assembly. Furthermore, problems of securing and maintaining proper interlocking connections are avoided. This construction also permits replacement of the seal member without having to replace the entire seal assembly.

In the drawings and specifications, there has been set forth a preferred embodiment of the invention and, although specific terms are employed, these are used in a generic and descriptive sense only and not for purposes of limitation. Changes in form and the proportion of parts as well as the substitution of equivalents are contemplated as circumstances may suggest or render expedient without departing from the spirit or scope of this invention.

I claim:

1. In a centrifugal apparatus, the combination comprising: a fluid container having a wall portion defining an opening therein; a rotatable means having a shaft extending axially through said opening; means for supporting said rotatable means for rotation and for generally lateral movement of said shaft relative to said opening; a seal assembly encircling said shaft and sealed to said fluid container for substantially closing said opening, said seal assembly including a resilient portion for permitting the lateral movement of said shaft; a seal member encircling said shaft at an axial position between said rotatable means and said seal assembly and having a noninterlocking relationship with said rotatable means and said seal assembly, said seal member including a first surface engageable with one of said seal assembly and said rotatable means to provide a static fluid seal therewith, said seal member further including a second surface engageable with the other of said seal assembly and said rotatable means to provide a static and a dynamic fluid seal therewith; and means for maintaining engagement of said seal member with said rotatable means and said seal assembly to maintain said static and dynamic seals.

UNITED STATES PATENT OFFICE
CERTIFICATE OF CORRECTION

Patent No. 3,582,091  Dated June 1, 1971

Inventor(s) Thomas R. Smith

It is certified that error appears in the above-identified patent and that said Letters Patent are hereby corrected as shown below:

Insert colums 5 and 6 as part of Letters Patent 3,582,091.

Signed and sealed this 9th day of April 1974.

(SEAL)
Attest:

EDWARD M. FLETCHER, JR.
Attesting Officer

C. MARSHALL DANN
Commissioner of Patents